United States Patent
Nakajo et al.

(10) Patent No.: US 9,001,349 B2
(45) Date of Patent: Apr. 7, 2015

(54) COMMUNICATION TERMINAL DEVICE, INFORMATION PROCESSING SYSTEM AND IMAGE TRANSMITTING METHOD

(71) Applicant: Murata Machinery, Ltd., Kyoto-shi, Kyoto (JP)

(72) Inventors: Natsuko Nakajo, Kyoto (JP); Sumiko Maezaki, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 14/026,081

(22) Filed: Sep. 13, 2013

(65) Prior Publication Data

US 2014/0085661 A1 Mar. 27, 2014

(30) Foreign Application Priority Data

Sep. 27, 2012 (JP) .................. 2012-214942

(51) Int. Cl.
*G06K 15/00* (2006.01)
*H04N 1/00* (2006.01)

(52) U.S. Cl.
CPC ....... *H04N 1/00026* (2013.01); *H04N 1/00838* (2013.01); *H04N 1/00209* (2013.01); *H04N 1/00408* (2013.01); *H04N 1/00474* (2013.01); *H04N 1/00925* (2013.01); *H04N 2201/001* (2013.01); *H04N 2201/0072* (2013.01); *H04N 2201/0094* (2013.01)

(58) Field of Classification Search
USPC .................................. 358/1.14, 1.1
See application file for complete search history.

(56) References Cited

U.S. PATENT DOCUMENTS

2010/0110485 A1* 5/2010 Watariuchi ............. 358/1.15
2011/0320928 A1 12/2011 Kuroda

FOREIGN PATENT DOCUMENTS

JP 2012-014280 A 1/2012
JP 2012-048442 A 3/2012

* cited by examiner

*Primary Examiner* — Martin Mushambo
(74) *Attorney, Agent, or Firm* — Keating & Bennett, LLP

(57) ABSTRACT

A communication terminal device is connected to an information processing device in a communicatable status and includes a display unit, a storage unit, an acquiring unit that acquires display image data displayed on the display unit and stores the acquired display image data in the storage unit, a transmitting unit that transmits the display image data stored in the storage unit to the information processing device in response to a request from the information processing device, a deciding unit that decides whether the communication terminal device is maintained in a preset specific status or not, and an inhibiting unit that inhibits the display image data displayed on the display unit from being transmitted to the information processing device when the deciding unit decides that the communication terminal device is maintained in the preset specific status.

14 Claims, 11 Drawing Sheets

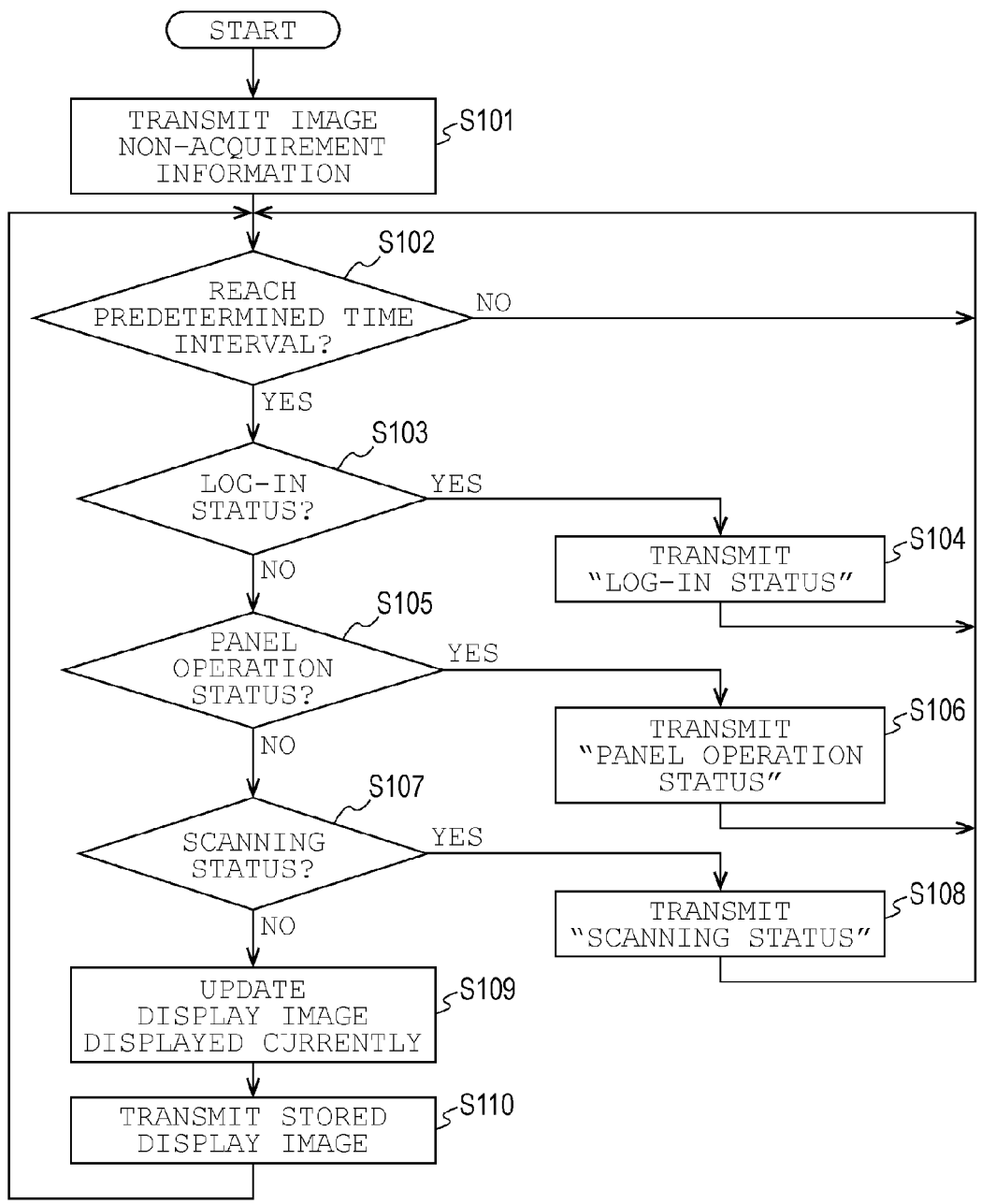

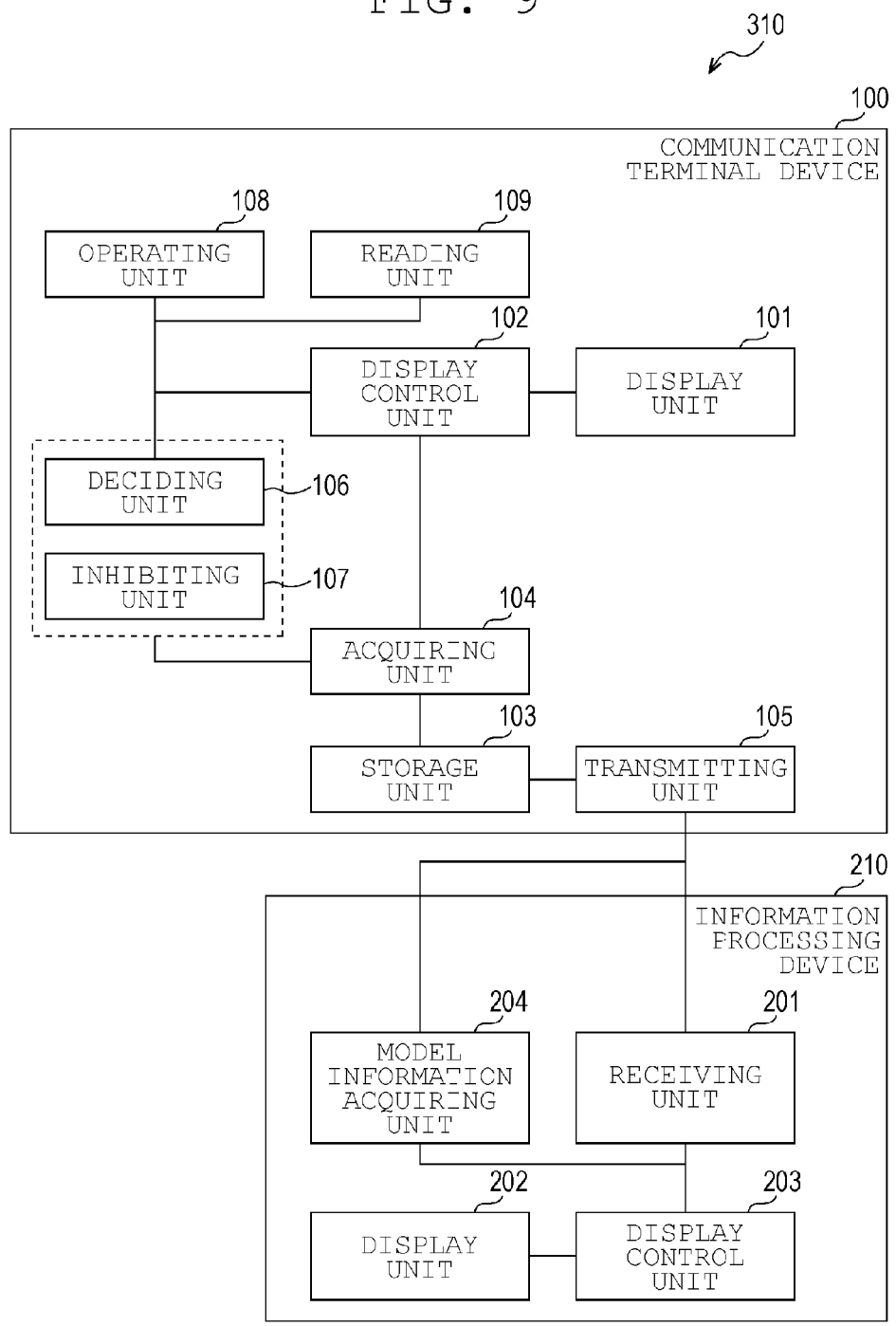

COMMUNICATION TERMINAL DEVICE, INFORMATION PROCESSING SYSTEM AND IMAGE TRANSMITTING METHOD

CROSS-REFERENCE TO RELATED APPLICATIONS

This application claims priority under 35 U.S.C. 119 to Japanese Patent Application No. 2012-214942, filed on Sep. 27, 2012, which application is hereby incorporated by reference in its entirety.

BACKGROUND OF THE INVENTION

1. Field of the Invention

The present invention relates to a communication terminal device to be connected to an information processing device in a communicatable status, an information processing system including the communication terminal device, and an image transmitting method using the communication terminal device.

2. Description of the Related Art

An information processing device (PC: Personal Computer) connected to a communication terminal device such as an MFP (Multifunction Peripheral) through a network acquires status information from the communication terminal device, thereby displaying a status of the communication terminal device indicated by the acquired status information in a display unit of the information processing device. The status of the communication terminal device is a current error situation of the communication terminal device or the like, for example. Consequently, a user of the information processing device can know the status of the communication terminal device in a location that is different from a location of the communication terminal device. For this reason, a service technician in a location that is different from a location in which the MFP is installed can determine the error situation of the MFP by utilizing the information processing device, for example. Even if the service technician does not move to the location in which the MFP having an error generated is present, accordingly, the service technician can teach a user of the MFP how to correct the error of the MFP, thereby reducing a time required for the service technician to correct the error.

For example, if a structure in which the communication terminal device includes a web server is employed, the information processing device gives access to the web server through a web browser, thereby acquiring the status of the communication terminal device and displaying the acquired status. Since displayed contents at this time are displayed on a dedicated screen for displaying the status in the web browser, they have a completely different display mode from the contents displayed on the display unit of the communication terminal device at that time. For this reason, there is a problem in that the service technician in the location that is different from a location in which the communication terminal device is installed cannot easily determine the contents which are currently displayed on the display unit of the communication terminal device, and it is difficult to determine the current status of the communication terminal device.

Therefore, there is known the technique for transmitting, to the information processing device, a web page including the same image as an image to be displayed on the display unit provided in the communication terminal device. Consequently, the same image as the image to be displayed on the display unit of the communication terminal device can be confirmed by the information processing device in the location that is different from a location in which the communication terminal device is installed.

However, image data including the contents which should not be released to the user (service technician) of the information processing device by the user of the communication terminal device is also transmitted from the communication terminal device to the information processing device in some cases. In other words, there is a problem in that the leakage of the contents on the screen to be displayed on the display unit out to the user of the information processing device is not taken into consideration against the will of the user of the communication terminal device.

SUMMARY OF THE INVENTION

Preferred embodiments of the present invention provide a communication terminal device or the like which can prevent contents on a screen to be displayed on a display unit of the communication terminal device from leaking out to a user of an information processing device against the will of the user of the communication terminal device.

A communication terminal device according to a preferred embodiment of the present invention is a communication terminal device to be connected to an information processing device in a communicatable status, and includes a display unit, a storage unit, an acquiring unit arranged to acquire display image data displayed on the display unit and to store the acquired display image data in the storage unit, a transmitting unit arranged to transmit the display image data stored in the storage unit to the information processing device in response to a request from the information processing device, a deciding unit arranged to decide whether the communication terminal device is maintained in a preset specific status or not, and an inhibiting unit arranged to inhibit the display image data displayed on the display unit from being transmitted to the information processing device by the transmitting unit when the deciding unit decides that the communication terminal device is maintained in the preset specific status.

Consequently, the display image data displayed on the display unit can be prevented from being transmitted to the information processing device by the transmitting unit when the communication terminal device is maintained in the preset specific status. Therefore, the contents on the screen indicated by the display image data can be prevented from leaking out to the user of the information processing device.

Moreover, an operating unit arranged to accept an operation from a user may be provided, and the deciding unit may decide that the communication terminal device is maintained in the preset specific status in a case where the operating unit is operated by a user.

Therefore, the display image data displayed on the display unit can be prevented from being transmitted to the information processing device by the transmitting unit in the case in which the operation of the operating unit is carried out by the user.

For example, furthermore, the deciding unit may decide that the communication terminal device is maintained in the preset specific status in a case where the operating unit accepts at least one of an operation of registering or changing a destination for a destination table and an operation of registering or changing a password for logging in to the communication terminal device by the user.

Consequently, the display image data displayed on the display unit can be inhibited from being transmitted to the information processing device by the transmitting unit when any of the following operations is accepted by the operating unit. The operation includes the operation of registering or changing a destination for a destination table and the operation of registering or changing a password for logging in to the communication terminal device by a user. For this reason, the contents registered in the destination table or the password can be prevented from leaking out to the user of the information processing device.

Moreover, the deciding unit may decide that the communication terminal device is maintained in the preset specific status in a case where the operating unit accepts an input of a password.

Consequently, the display image data displayed on the display unit is inhibited from being transmitted to the information processing device by the transmitting unit when the operating unit accepts the input of the password. When the password is to be input, for example, the password itself is not displayed on the display unit but a mark (for example, "*") of the number corresponding to the number of digits of the password is displayed. If the display image data at this time is acquired, the user of the information processing device can know the number of digits of the password by counting the number of "*". When the password is to be input, moreover, it is also possible to suppose the case in which the password itself is displayed on the display unit. If the display image data at this time is acquired, the user of the information processing device can know the password itself. In other words, the communication terminal device according to a preferred embodiment of the present invention can prevent the number of the digits of the password or the password from leaking out to the user of the information processing device.

Furthermore, a reading unit arranged to read a document may be provided, and the deciding unit may decide that the communication terminal device is maintained in the preset specific status in a case where a result of the reading is previewed and displayed on the display unit.

Consequently, the display image data in the preview and display of the reading result on the display unit can be inhibited from being transmitted to the information processing device by the transmitting unit. For this reason, the contents of the read document can be prevented from leaking out to the user of the information processing device.

Moreover, the deciding unit may decide that the communication terminal device is maintained in the preset specific status in a case where a user logs in to the communication terminal device.

Consequently, the display image data displayed during the log-in to the communication terminal device by the user is inhibited from being transmitted to the information processing device by the transmitting unit. For example, therefore, the contents of the user dedicated screen displayed on the display unit during the log-in can be prevented from leaking out to the user of the information processing device.

Furthermore, the acquiring unit may acquire the display image data displayed on the display unit at a predetermined time interval and may update the display image data stored in the storage unit into the display image data acquired at the predetermined time interval at any time, and the inhibiting unit may prevent the display image data stored in the storage unit from being updated by the acquiring unit, so as to inhibit the display image data displayed on the display unit from being transmitted to the information processing device by the transmitting unit in a case where the deciding unit decides that the communication terminal device is maintained in the preset specific status. Moreover, the acquiring unit may update the display image data stored in the storage unit into the display image data displayed on the display unit every time the display image data displayed on the display unit is updated, and the inhibiting unit may prevent the display image data stored in the storage unit from being updated by the acquiring unit, so as to inhibit the display image data displayed on the display unit from being transmitted to the information processing device by the transmitting unit in a case where the deciding unit decides that the communication terminal device is maintained in the preset specific status.

Consequently, the inhibiting unit prevents the display image data stored in the storage unit from being updated in a case where the deciding unit decides that the communication terminal device is maintained in the preset specific status. For this reason, it is possible to prevent the display image data displayed on the display unit from being transmitted to the information processing device by the transmitting unit when the communication terminal device is maintained in the preset specific status.

For example, moreover, in a case where the deciding unit decides that the communication terminal device is maintained in the preset specific status, the transmitting unit may further transmit, to the information processing device, status information indicating that the communication terminal device is maintained in the preset specific status.

For this reason, the user of the information processing device can know that the status of the communication terminal device is equivalent to the status in which the update to the display image data displayed on the display unit at that time cannot be carried out.

For example, moreover, the transmitting unit may transmit, to the information processing device, the display image data stored in the storage unit together with the status information when transmitting the status information to the information processing device.

Therefore, the user of the information processing device can know that the communication terminal device is set into a status in which the display image data displayed on the display unit at that time cannot be updated, and furthermore, the contents of the newest display image data which has not been brought into an update disabling status.

Moreover, the transmitting unit may transmit, to the information processing device, acquirement disabling information indicating that the display image data is acquired in a case where the acquiring unit acquires no display image data displayed on the display unit.

Therefore, the user of the information processing device can know that the communication terminal device cannot acquire the display image data.

In addition, the transmitting unit may transmit, to the information processing device, the display image data stored in the storage unit together with the acquirement disabling information when transmitting the acquirement disabling information to the information processing device.

Therefore, the user of the information processing device can know that the communication terminal device cannot acquire the display image data, and furthermore, the contents of the newest display image data before the display image data cannot be acquired.

Moreover, the transmitting unit may transmit, to the information processing device, image non-acquirement information indicating that the display image data has not been acquired yet in a case where the acquiring unit has not acquired the display image data displayed on the display unit yet.

Therefore, the user of the information processing device can know that the display image data has not been displayed on the display unit in the communication terminal device yet.

In addition, an operation panel including an operation button and a display lamp may be provided, and the acquiring unit may further acquire terminal status information indicative of a communication terminal status of the communication terminal device which is displayed on the display lamp, and the transmitting unit may further transmit the terminal status information acquired by the acquiring unit to the information processing device.

These general or specific modes may be implemented by a system, a method, an integrated circuit, a computer program, or a recording unit such as a computer readable CD-ROM, for example. Moreover, these general or specific modes may be implemented by an optional combination of the system, the method, the integrated circuit, the computer program and the recording unit.

According to the communication terminal device and the image transmitting method in accordance with preferred embodiments of the present invention, in the case in which the communication terminal device is maintained in the preset specific status, the display image data displayed on the display unit of the communication terminal device can be prevented from being transmitted to the information processing device by the transmitting unit and the contents on the screen indicated by the display image data can be prevented from leaking out to the user of the information processing device.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a flow chart illustrating a processing procedure in image transmission processing through the information processing system according to the present preferred embodiment.

FIG. 9 is a block diagram illustrating a functional structure related to image transmission processing of a network multifunction peripheral according to the another preferred embodiment of the present invention.

DETAILED DESCRIPTION OF THE PREFERRED EMBODIMENTS

A communication terminal device and an image transmitting method according to preferred embodiments of the present invention will be specifically described below with reference to the drawings.

Preferred embodiments which will be described below indicate specific examples of the present invention. Numeric values, shapes, materials, components, arrangement positions and connection configurations of the components, steps, order of the steps and the like which will be described in the following preferred embodiments are only illustrative and do not restrict the present invention. Moreover, many of the components in the following preferred embodiments which are to be discussed below are optional components which are not specifically required in order to practice the present invention.

First of all, description will be given to a summary of a structure of an information processing system according to a preferred embodiment of the present invention.

Figure 1:
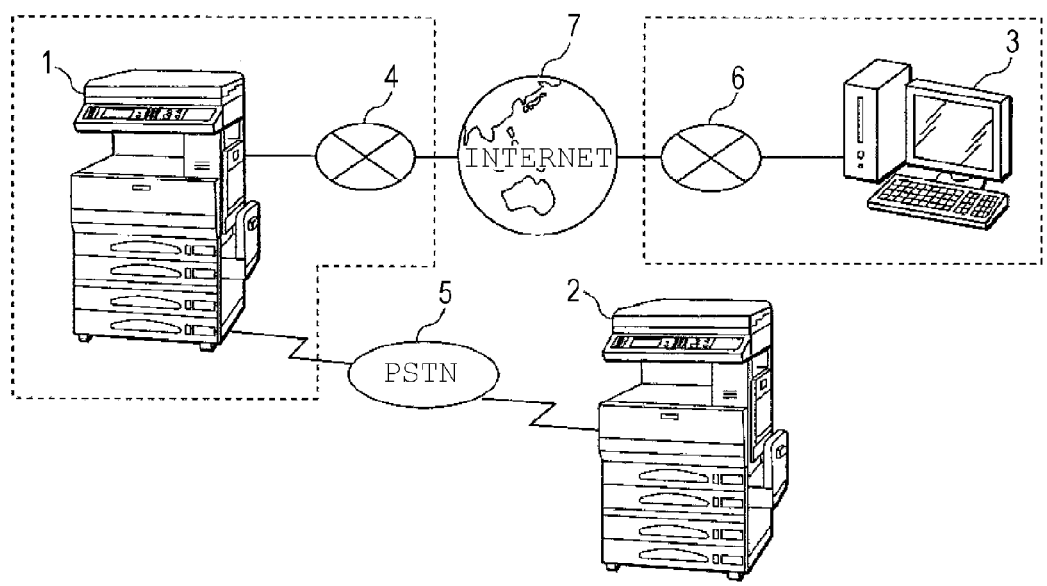
FIG. 1 is a view illustrating an example of a structure of an information processing system according to a preferred embodiment of the present invention.

FIG. 1 is a view illustrating an example of the structure of the information processing system according to a preferred embodiment of the present invention.

As illustrated in FIG. 1, the information processing system is preferably defined by network multifunction peripherals 1 and 2, an information terminal 3, a PSTN (Public Switched Telephone Networks) 5, LANS (Local Area Networks) 4 and 6, and an internet 7, for example.

The information terminal 3 is preferably a computer which functions as an information processing device according to the present preferred embodiment. The information terminal 3 is preferably a personal computer to be used by a service technician taking a countermeasure against a malfunction upon receipt of contact when the malfunction occurs in the network multifunction peripheral 1 or the network multifunction peripheral 2 from a user thereof in the present preferred embodiment. In other words, the information terminal 3 is preferably provided in a location remote from a location in which the network multifunction peripheral 1 or the network multifunction peripheral 2 is present, and is connected to the internet 7 through the LAN 6.

The network multifunction peripherals 1 and 2 function as communication terminal devices according to the present preferred embodiment and can carry out facsimile transmission of a document read by a scanner from one of sides to the other side through the PSTN 5, for example, transmission of the document to the information terminal 3 through the LAN 4 and the internet 7, printout of the document through a built-in printer, and the like.

Figure 2:
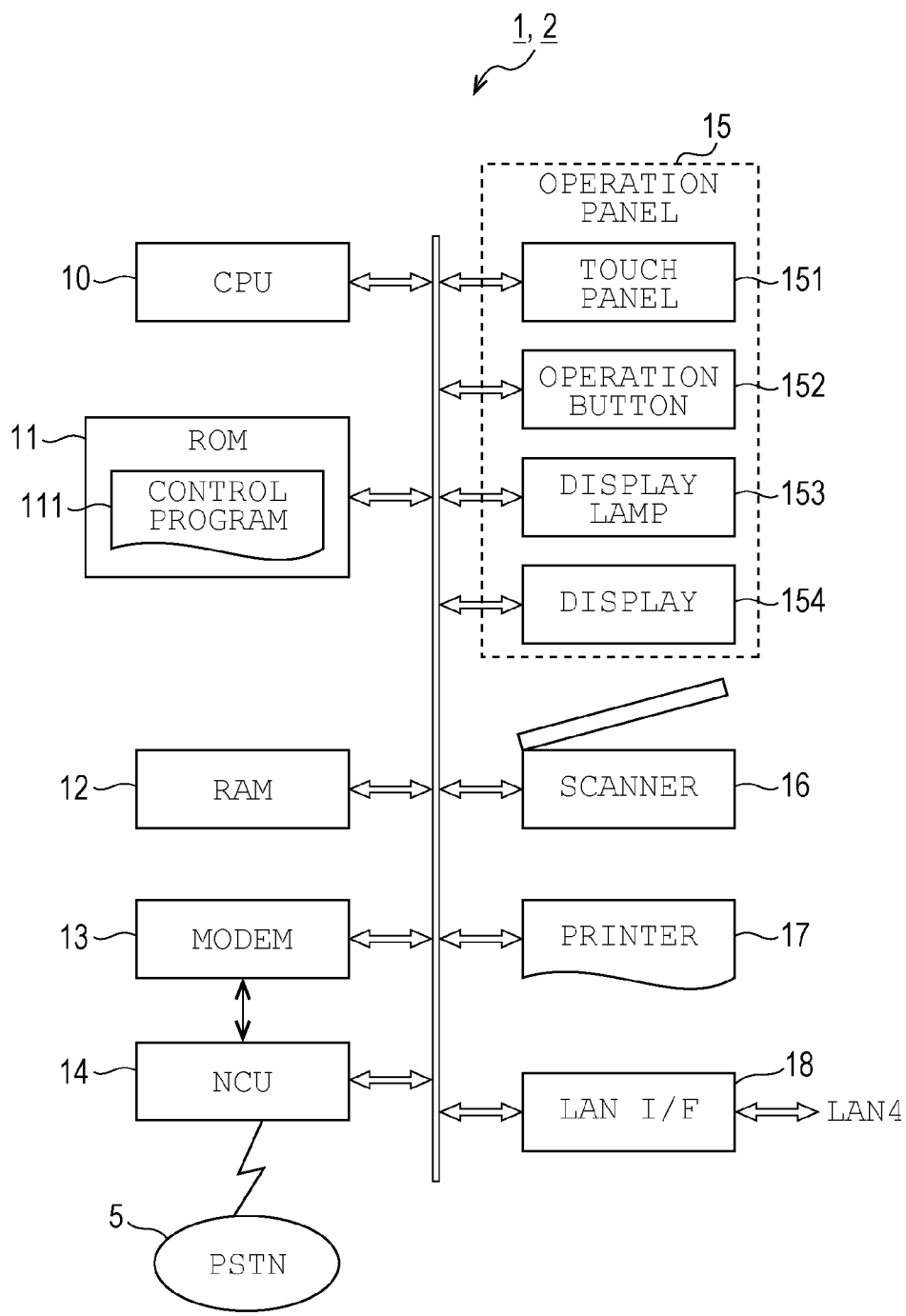
FIG. 2 is a block diagram illustrating a hardware structure of a network multifunction peripheral according to the present preferred embodiment.

FIG. 2 is a block diagram illustrating an example of a preferred hardware structure of the network multifunction peripherals 1 and 2 according to the present preferred embodiment. Since the network multifunction peripherals 1 and 2 preferably have the same or substantially the same structures, only the network multifunction peripheral 1 will be described below.

Although the network multifunction peripheral 1 and the information terminal 3 are preferably connected to each other through the LANS 4 and 6 and the internet 7 in the present preferred embodiment, the configuration is only illustrative and it is sufficient that both of them are connected in a communicatable condition through a network, and the present invention is not restricted to the specific configuration depicted.

As illustrated in FIG. 2, the network multifunction peripheral 1 preferably includes a CPU (Central Processing Unit) 10, an ROM (Read Only Memory) 11, an RAM (Random Access Memory) 12, a modem 13, an NCU (Network Control Unit) 14, an operation panel 15, a scanner 16, a printer 17, and an LAN I/F (LAN interface) 18, for example.

The CPU 10 is arranged and programmed to execute a control program 111 stored in the ROM 11, so as to control the whole network multifunction peripheral 1.

The ROM 11 is a read only memory arranged to hold the control program 111 to be executed by the CPU 10.

The RAM 12 is a readable/writable memory arranged and programmed to temporarily hold work data to be used in the execution of the control program 111 by the CPU 10, image data obtained from the scanner 16, and the like.

The modem 13 is arranged to modulate the image data held in the RAM 12 or the like into a facsimile signal and transmit the facsimile signal, and to demodulate the facsimile signal received from an outside into image data. The modem 13 is a preferably fax modem conforming to the G3 standard, for example.

The NCU 14 is a network control device arranged and programmed to control connection of the modem 13 and the PSTN 5.

The operation panel 15 preferably includes a touch panel 151 and an operation button 152 which accept an operation from a user, and a display lamp 153 and a display 154 (see FIG. 6 which will be described below). The display lamp 153 is preferably a lamp defined by an LED arranged to display a status of the network multifunction peripheral 1 or the like, and to switch a status of ON, OFF or flashing or switches an ON color, so as to display the status of the network multifunction peripheral 1. The display 154 is a display device arranged to guide an operation to a user or display an activity condition of the network multifunction peripheral 1, and is an LCD (Liquid Crystal Display), for example.

The scanner 16 is an image scanning device and is arranged to optically read a document by using an image sensor such as, for example, a CCD (Charge Coupled Device) or a CMOS (Complementary Metal Oxide Semiconductor) under control of the CPU 10, so as to generate image data.

The printer 17 is a printer and preferably serves to print and output an image represented by the image data held in the RAM 12 under the control of the CPU 10, for example.

The LAN I/F 18 is a communication adapter arranged to connect the network multifunction peripheral 1 to the LAN 4 and serves to transmit the image data held in the RAM 12 to the information terminal 3 or the like under the control of the CPU 10, for example.

Figure 3:
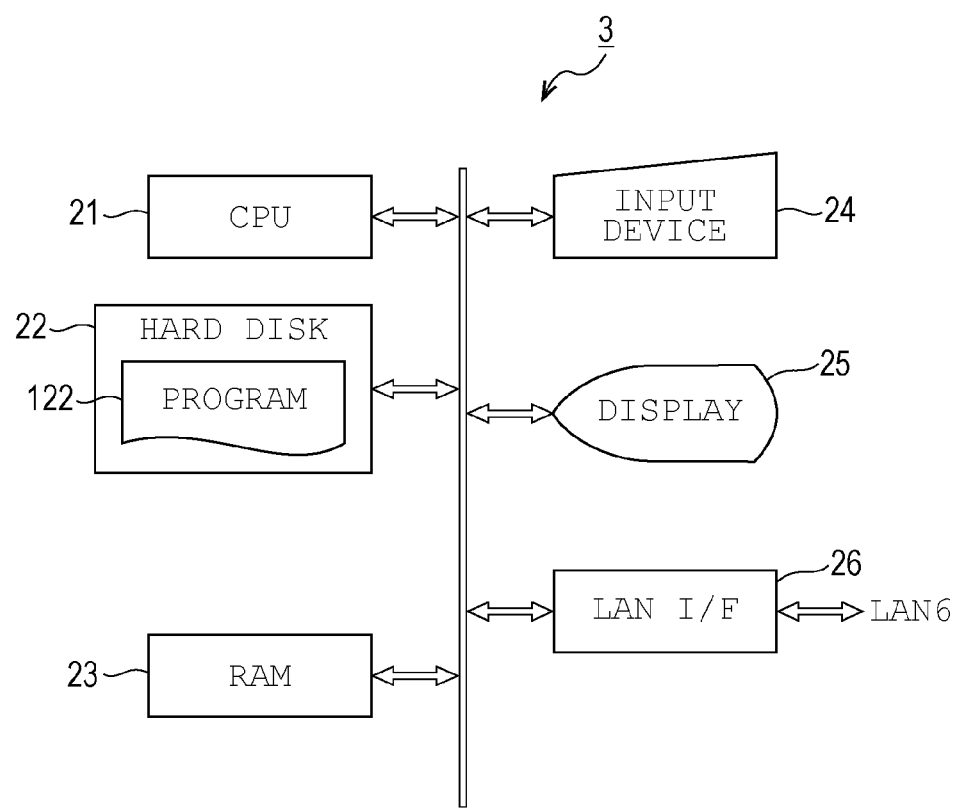
FIG. 3 is a block diagram illustrating a hardware structure of an information terminal according to the present preferred embodiment.

FIG. 3 is a block diagram illustrating an example of a hardware structure of the information terminal 3 according to the present preferred embodiment.

As illustrated in FIG. 3, the information terminal 3 preferably mainly includes a CPU 21, a hard disk 22, an RAM 23, an input device 24, a display 25, and an LAN I/F 26.

The CPU 21 is arranged and programmed to execute a program 122 stored in the hard disk 22, so as to control the whole information terminal 3.

The hard disk 22 is arranged to store the program 122 and the like.

The RAM 23 is a readable/writable memory arranged to temporarily hold various pieces of data to be used when the CPU 21 executes the program 122 stored in the hard disk 22.

The input device 24 serves to accept an operation from the user and is a keyboard, a pointing device such as, for example, a mouse or a touch panel, or the like.

The display 25 is preferably, for example, a CRT display, an LCD, a plasma display, an organic EL display or the like which displays the data held in the RAM 23 as a character or an image.

The LAN I/F 26 is preferably a communication adapter arranged to connect the information terminal 3 to the LAN 6. The LAN I/F 26 transmits the program 122 held in the hard disk 22 of the information terminal 3 and various pieces of data to another information terminal (not illustrated) to be connected to the LAN 6 or the internet 7 or the like under the control of the CPU 21, for example. The LAN I/F 26 also receives various pieces of data transmitted to the information terminal 3 from another information terminal or the network multifunction peripheral 1.

Figure 4:
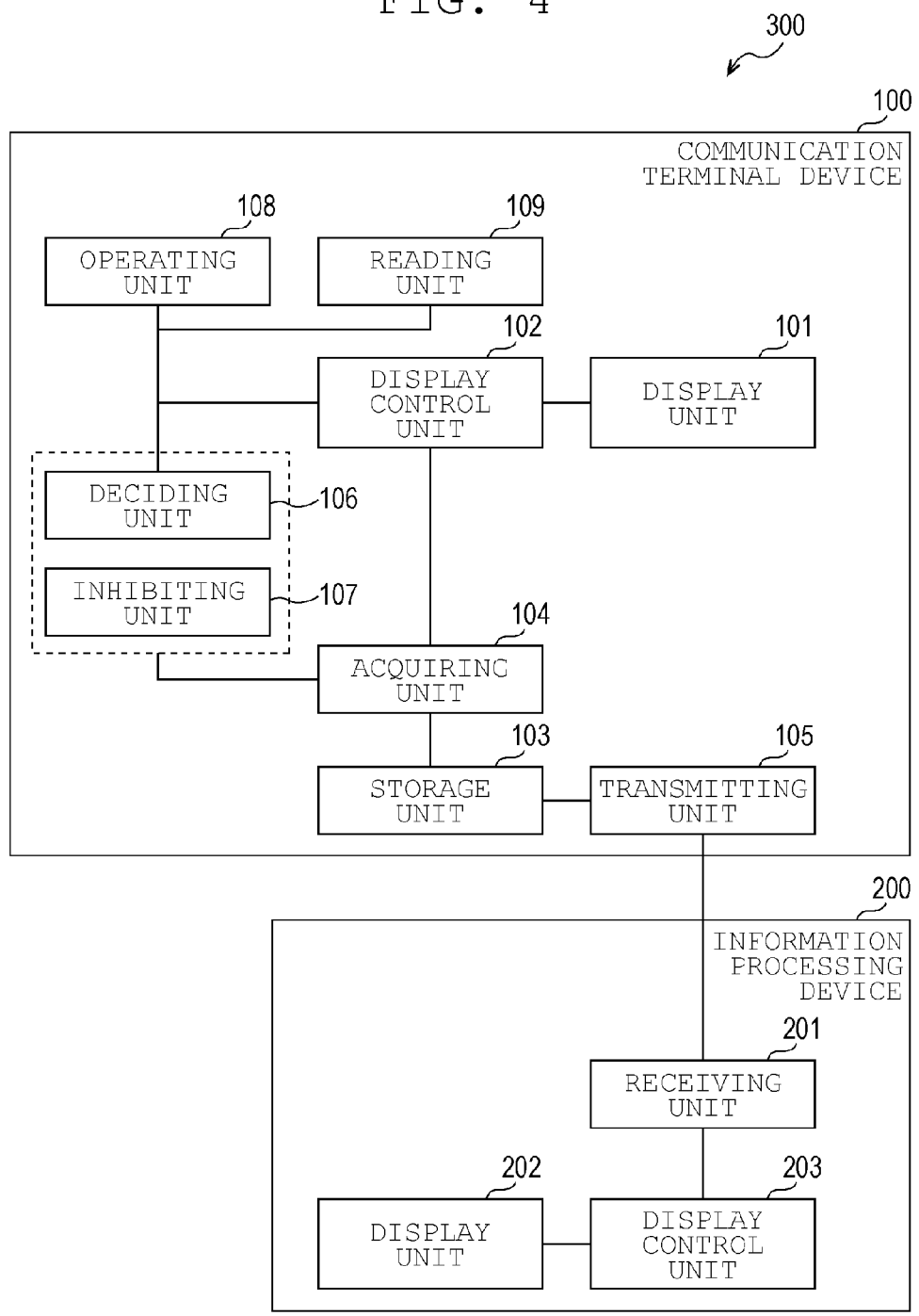
FIG. 4 is a block diagram illustrating a functional structure related to image transmission processing of the network multifunction peripheral according to the present preferred embodiment.

FIG. 4 is a block diagram illustrating a functional structure related to image transmission processing of the network multifunction peripheral 1 and the information terminal 3 according to the present preferred embodiment. In other words, FIG. 4 is a block diagram mainly illustrating a structure of a function related to image transmission processing of a communication terminal device 100 and an information processing device 200 according to the present preferred embodiment in the functions of the network multifunction peripheral 1 and the information terminal 3 which are exerted by the hardware structures illustrated in FIGS. 2 and 3.

The communication terminal device 100 preferably functionally includes a display unit 101, a display control unit 102, a storage unit 103, an acquiring unit 104, a transmitting unit 105, a deciding unit 106, an inhibiting unit 107, an operating unit 108 and a reading unit 109. The communication terminal device 100 is also preferably connected in a communicatable status with the information terminal 3 serving as the information processing device 200 (for example, the internet 7 or the like).

The display unit 101 is preferably implemented by the display 154 in FIG. 2.

The display control unit 102 is preferably implemented by the CPU 10, the control program 111 or the like in FIG. 2. The display control unit 102 is arranged and programmed to generate display image data corresponding to the status of the communication terminal device 100 and to display the generated display image data on the display unit 101. In other words, the display control unit 102 is arranged and programmed to generate the display image data every time the status of the communication terminal device 100 is changed, and displays the newly generated display image data on the display unit 101. The status of the communication terminal device 100 preferably specifically includes, for example, a status in which the operating unit 108 accepts an operation from a user, a status in which the reading unit 109 reads a document, a status in which printing is carried out, and the like. The status in which the operating unit 108 accepts the operation from the user includes a status in which setting of printing, reading or the like is accepted, a status in which a destination is registered or changed for a destination table, a status in which a password for logging in to the communication terminal device by the user is registered or changed, a status in which the password for logging in to the communication terminal device by the user is input, and the like.

The storage unit 103 is preferably implemented by the RAM 23 or the like in FIG. 2. The storage unit 103 is a dedicated buffer region is arranged to temporarily store display image data acquired by the acquiring unit 104. In the present preferred embodiment, the storage unit 103 preferably stores only display image data indicative of a single image. The storage unit 103 does not need to be implemented by the RAM but may be implemented by a storage device such as, for example, a nonvolatile ROM, HDD (Hard Disk Drive) or SSD (Solid State Drive).

The acquiring unit 104 is preferably a control unit implemented by the CPU 10, the control program 111 or the like in FIG. 2. The acquiring unit 104 is preferably arranged and programmed to acquire the display image data displayed on the display unit 101 at a predetermined time interval (for example, an interval of about 10 seconds) and replaces the display image data stored in the storage unit 103 with the display image data acquired at the predetermined time interval and stores the display image data in the storage unit 103. Specifically, the acquiring unit 104 captures and acquires the display image data displayed on the display unit 101.

The acquiring unit 104 may have a structure that acquires the display image data through the capturing, and furthermore, to directly acquire the display image data displayed on the display unit 101 by the display control unit 102. In other words, it is also possible to employ a structure in which the display image data generated to be displayed on the display unit 101 by the display control unit 102 is acquired from a memory holding them temporarily.

Moreover, the acquiring unit 104 does not need to acquire the display image data displayed on the display unit 101 at the predetermined time interval but may instead acquire the display image data displayed on the display unit 101 every time they are updated by the display control unit 102. In other words, in a case where the acquiring unit 104 acquires the display image data displayed on the display unit 101, a frequency of the acquisition of the display image data, a timing or the like is not restricted to the structure.

The transmitting unit 105 is preferably a control unit implemented by the CPU 10, the control program 111, the LAN I/F 18 or the like in FIG. 2. The transmitting unit 105 is preferably arranged and programmed to transmit the display image data stored in the storage unit 103 to the information processing device 200 in response to a request from the information processing device 200.

In the case where the deciding unit 106 is arranged to decide that the communication terminal device 100 is maintained in a preset specific status, furthermore, the transmitting unit 105 is arranged to transmit, to the information processing device 200, status information indicating that the communication terminal device 100 is maintained in the preset specific status. At this time, the transmitting unit 105 is preferably arranged to transmit, to the information processing device 200, the display image data stored in the storage unit 103 together with the status information. However, the transmission of the status information to the information processing device 200 by the transmitting unit 105 is not an essential requirement. Moreover, the transmitting unit 105 may have a structure in which only the status information is transmitted and the display image data is not transmitted at this time.

The deciding unit 106 is preferably a control unit implemented by the CPU 10, the control program 111 or the like in FIG. 2. The deciding unit 106 is arranged and programmed to decide whether the communication terminal device 100 is maintained in the preset specific status or not. The "preset specific status" indicates the following three statuses, for example.

A first one of the statuses indicates a status in which the operating unit 108 is being operated by a user. Specifically, the first status indicates a status in which the operating unit 108 accepts at least one of an operation of registering or changing a destination of a destination table and an operation of registering or changing a password for logging in to the communication terminal device 100 by the user. Moreover, the first status may be set into a status in which the operating unit 108 accepts an input of the password from the user.

A second one of the statuses indicates a status in which a result of reading (scanning) through the reading unit 109 is previewed and displayed on the display unit 101. This status may be equivalent to a status in which the reading is carried out by the reading unit 109.

A third one of the statuses indicates a status in which the user is logging in to the communication terminal device 100. In other words, in a case where the user is carrying out the log-in, the deciding unit 106 decides that a preset specific status is maintained even if the operating unit 108 is not operated by the user.

The inhibiting unit 107 is preferably a control unit implemented by the CPU 10, the control program 111 or the like in FIG. 2. The inhibiting unit 107 is arranged and programmed to inhibit the display image data displayed on the display unit 101 from being transmitted to the information processing device 200 by the transmitting unit 105 when the deciding unit 106 decides that the communication terminal device 100 is maintained in the preset specific status. Specifically, the inhibiting unit 107 does not cause the acquiring unit 104 to update the display image data stored in the storage unit 103 in a case where the deciding unit 106 decides that the communication terminal device 100 is maintained in the preset specific status. Consequently, the inhibiting unit 107 is arranged and programmed to inhibit the display image data displayed on the display unit 101 from being transmitted to the information processing device 200 by the transmitting unit 105 when the communication terminal device 100 is maintained in the preset specific status.

The operating unit 108 is preferably implemented by the operation panel 15 in FIG. 2. The operating unit 108 accepts an operation from the user. Specifically, the operating unit 108 accepts an input which registers and changes a destination table, an input which registers and changes a password, an input which logs in to the communication terminal device 100, an input which transmits a FAX, an input which prints, scanning and copying operations, and the like.

The reading unit 109 is preferably implemented by the scanner 16 in FIG. 2. The reading unit 109 serves to read a document.

Moreover, the information processing device 200 preferably functionally includes a receiving unit 201, a display unit 202, and a display control unit 203.

The receiving unit 201 is preferably implemented by the LAN I/F 26 in FIG. 3. The receiving unit 201 is arranged to receive the display image data transmitted by the transmitting unit 105 of the communication terminal device 100.

The display unit 202 is preferably implemented by the display 25 in FIG. 3.

The display control unit 203 is preferably a control unit implemented by the CPU 21, the program 122 or the like in FIG. 3. The display control unit 203 is arranged and programmed to display, on the display unit 202, the display image data received from the receiving unit 201.

In this case, the display unit 101 of the communication terminal device 100 preferably functions as a first display unit and the display unit 202 of the information processing device 200 functions as a second display unit.

Next, description will be given to a processing procedure for image transmission processing according to the present preferred embodiment having the structure described above.

FIG. 5 is a flow chart illustrating a processing procedure in image transmission processing to be executed by an information processing system 300 according to the present preferred embodiment.

First of all, the image transmission processing is started when the network multifunction peripheral 1 is turned ON. The image transmission processing may be started in a return from a standby condition in addition to the ON operation of the network multifunction peripheral 1.

In the case in which the acquiring unit 104 has not acquired the display image data displayed on the display unit 101 yet, for example, immediately after the start of the image transmission processing, the transmitting unit 105 transmits, to the information terminal 3 serving as the information processing device 200, image non-acquirement information indicating that the display image data has not been acquired yet (S101). Immediately after the network multifunction peripheral 1 is turned ON, nothing is displayed on the display unit 101. For this reason, the display image data is not stored in the storage unit 103. In this case, accordingly, the acquiring unit 104 generates image non-acquirement information indicating that the display control unit 102 does not generate the display image data to be displayed on the display unit 101 when the display image data cannot be acquired, and stores the image non-acquirement information in the storage unit 103. Consequently, the transmitting unit 105 transmits, to the information terminal 3, the image non-acquirement information stored in the storage unit 103 at this time. The image non-acquirement information is a message indicating that an image cannot be acquired (captured), for example, a message of "an image has not been acquired yet" or the like. The information terminal 3 causes the display unit 202 to display the message when receiving the image non-acquirement information.

Next, the deciding unit 106 decides whether a predetermined time interval is reached or not (S102). Specifically, the deciding unit 106 decides whether an interval of 10 seconds to be the predetermined time interval is reached or not. In other words, the deciding unit 106 decides whether a timing at the predetermined time interval of, for example, 10 seconds is reached or not. If the deciding unit 106 decides that the predetermined time interval is not reached (S102: No), the Step S102 is repeated.

If the deciding unit 106 decides that the predetermined time interval is reached (S102: Yes), then, it decides whether the status of the network multifunction peripheral 1 serving as the communication terminal device 100 is a status in which the user is logging in to the network multifunction peripheral 1 (which will be hereinafter referred to as a "log-in status") or not (S103). If the deciding unit 106 decides that the status of the network multifunction peripheral 1 is the log-in status (S103: Yes), the transmitting unit 105 transmits status information indicative of the log-in status to the information terminal 3 (S104). In this case, specifically, the acquiring unit 104 generates the status information indicative of the log-in status and stores the generated status information in the storage unit 103. Consequently, the transmitting unit 105 transmits, to the information terminal 3, the status information stored in the storage unit 103 at this time. The status information indicative of the log-in status is a message indicating that the log-in is being carried out, for example, preferably a message of "the newest image cannot be displayed during the log-in" or the like. When the status information generated by the acquiring unit 104 is to be stored in the storage unit 103, the acquiring unit 104 updates the display image data to bring about a condition in which the message is superposed on the display image data in a case where the display image data has already been stored in the storage unit 103. For this reason, the message is displayed on the display unit 202 of the information terminal 3 together with the display image data stored in the storage unit 103 before the log-in status is provided. The display image data stored in the storage unit 103 before the log-in status is provided is the newest display image data stored in the storage unit 103 before a preset specific status is provided.

If the deciding unit 106 decides that the network multifunction peripheral 1 is not maintained in the log-in status (S103: No), it decides whether the status of the network multifunction peripheral 1 is equivalent to a status in which the operating unit 108 is operated by the user (which will be hereinafter referred to as a "panel operating status") or not (S105).

If the deciding unit 106 decides that the status of the network multifunction peripheral 1 is equivalent to the panel operating status (S105: Yes), the transmitting unit 105 transmits, to the information terminal 3, status information indicating that the panel operating status is provided (S106). In this case, specifically, the acquiring unit 104 generates the status information indicating that the panel operating status is provided and stores the generated status information in the storage unit 103. Consequently, the transmitting unit 105 transmits, to the information terminal 3, the status information stored in the storage unit 103 at this time. The status information indicating that the panel operating status is provided is a message indicating that a panel operation is being carried out, for example, preferably a message of "the newest image cannot be displayed during the panel operation" or the like. The acquiring unit 104 updates the display image data to bring about a condition in which the message is superposed on the display image data in a case where the display image data has already been stored in the storage unit 103 in the same manner as the case of the log-in status when the status information is to be stored.

If the deciding unit 106 decides that the status of the network multifunction peripheral 1 is not equivalent to the panel operating status (S105: No), it decides whether the status of the network multifunction peripheral 1 is equivalent to a status in which reading (scanning) is being carried out by the reading unit 109 (which will be hereinafter referred to as a "scanning status") or not (S107).

If the deciding unit 106 decides that the status of the network multifunction peripheral 1 is equivalent to the scanning status (S107: Yes), the transmitting unit 105 transmits, to the information terminal 3, status information indicating that the scanning status is provided (S108). In this case, specifically, the acquiring unit 104 generates the status information indicating that the scanning status is provided and stores the generated status information in the storage unit 103. Consequently, the transmitting unit 105 transmits, to the information terminal 3, the status information stored in the storage unit 103 at this time. The status information indicating that the scanning status is provided is a message indicating that the scanning is being carried out, for example, a message of "the newest image cannot be displayed during the scanning" or the like. When the status information is to be stored, the acquiring unit 104 updates the display image data to bring about a condition in which the message is superposed on the display image data in a case where the display image data has already been stored in the storage unit 103 in the same manner as the case of the log-in status and the panel operating status.

If the deciding unit 106 decides that the status of the network multifunction peripheral 1 is not equivalent to the scanning status (S107: No), the acquiring unit 104 acquires display image data which is being displayed currently on the display unit 101. Then, the acquiring unit 104 updates the display image data stored in the storage unit 103 into the acquired display image data (S109).

In the case in which the display image data stored in the storage unit 103 is updated into new display image data, the transmitting unit 105 transmits, to the information terminal 3, the newest display image data stored in the storage unit 103 (S110). When the processing of the Step S110 is ended, the processing returns to the Step S102. The image transmission processing is ended when the network multifunction peripheral 1 is turned OFF or the network multifunction peripheral 1 is brought into a standby status.

In the processing of the Steps S103 to S109, it is decided whether the status of the network multifunction peripheral 1 is a predetermined specific status in Steps S103, S105, and S107 or not. If any of the results of the decision is "Yes", the transmitting unit 105 transmits, to the information terminal 3, status information indicative of the log-in status, the panel operating status or the scanning status together with the display image data which has already been stored in the storage unit 103. In other words, in a case where the deciding unit 106 decides that the status of the network multifunction peripheral 1 is equivalent to the predetermined specific status, the transmitting unit 105 does not transmit the display image data which is being displayed on the display unit 101 at that time but transmits, to the information terminal 3, the status information indicative of the preset specific status together with the display image data which is displayed on the display unit 101 previously. If all of the results of the decision are "No", moreover, the display image data stored in the storage unit 103 is updated into the display image data which is being displayed currently on the display unit 101. For this reason, the display image data which is being displayed currently on the display unit 101 is transmitted to the information terminal 3 by the transmitting unit 105.

For three decisions of the Steps S103, S105, and S107, it is sufficient that a decision of any of the three preset specific statuses can be made. For this reason, it is not essential to make the decision in order. Although the three decisions are made in series, moreover, they may be made through parallel processing.

Although there is employed the structure in which the transmitting unit 105 preferably transmits the display image data (including the display image data having the status information) to the information terminal 3 every time the display image data stored in the storage unit 103 is updated in the image transmission processing, furthermore, the present invention is not restricted thereto. In other words, it is also possible to execute, in parallel, the processing related to the update of the display image data stored in the storage unit 103 and the processing related to the transmission, to the information terminal 3, of the display image data stored in the storage unit 103 through the transmitting unit 105. In this case, it is preferable that the frequency of the processing related to the update and that of the processing related to the transmission should be equal to each other (for example, once every 10 seconds).

Figure 6A:
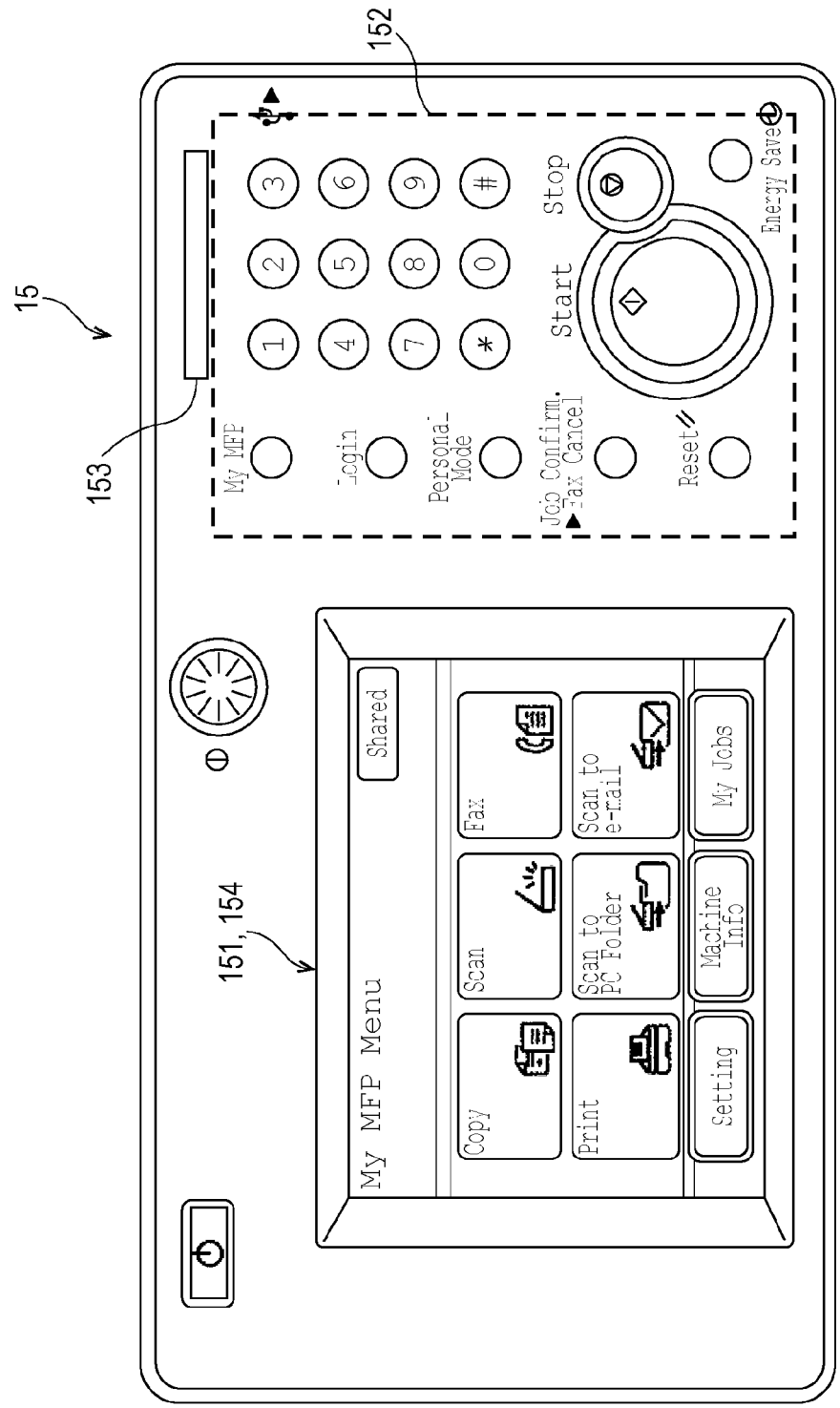
FIG. 6A is a view illustrating an external appearance of an operation panel of the network multifunction peripheral and FIG. 6B is a view explaining an image to be displayed on a display of the information terminal.
Figure 6B:
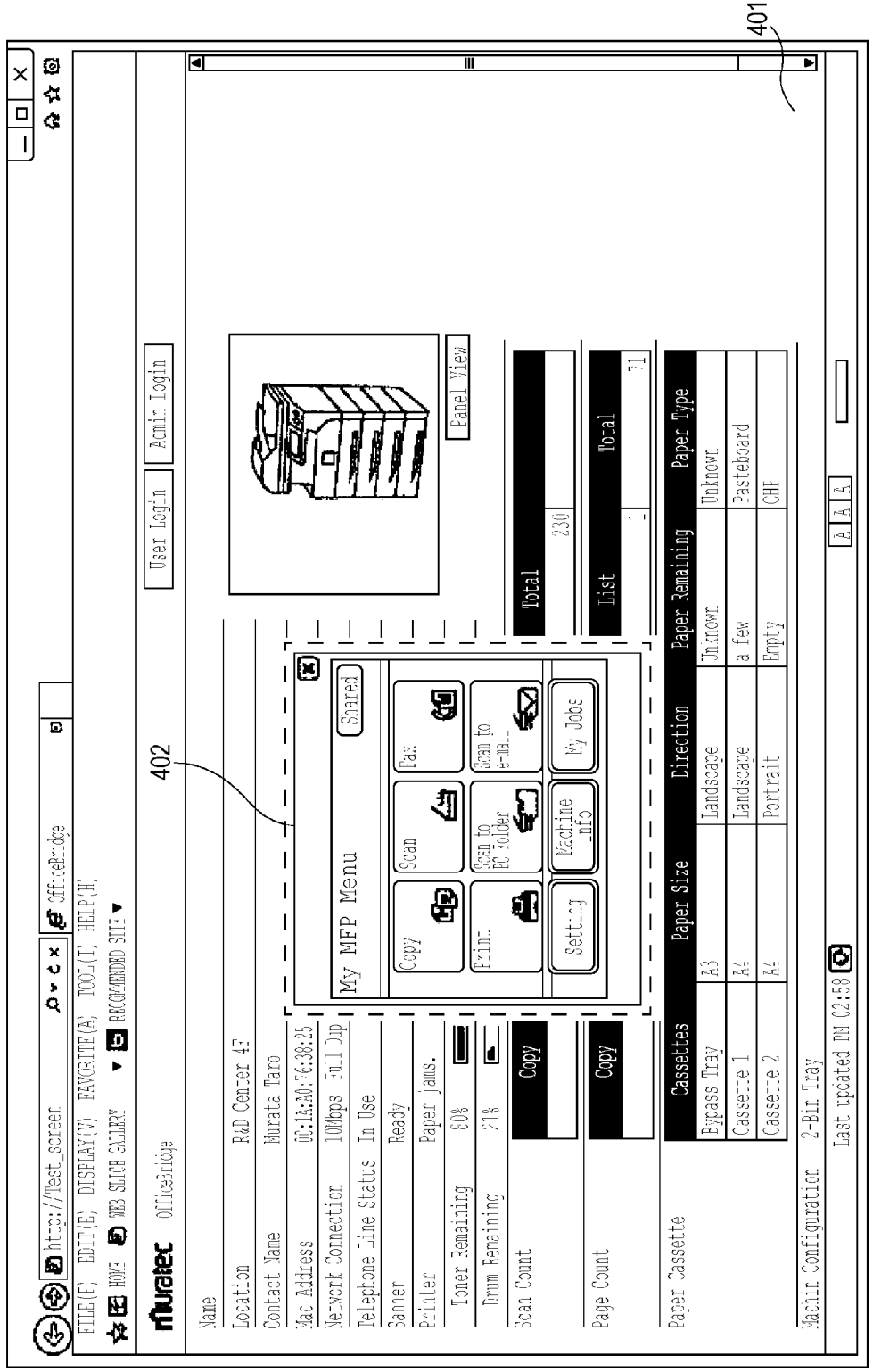

FIGS. 6A and 6B are views explaining the transmission of an image displayed on the display unit 101 of the network multifunction peripheral 1.

FIG. 6A is a view illustrating an external appearance of the operation panel 15 in the network multifunction peripheral 1 and FIG. 6B is a view explaining an image displayed on the display 25 of the information terminal 3.

As illustrated in FIG. 6A, the operation panel 15 preferably includes the touch panel 151 and the operation button 152 which serve to accept an operation from a user, and the display lamp 153 and the display 154 which serve to display the status of the network multifunction peripheral 1. The touch panel 151 is an input device arranged to detect a position specified by the user over a display surface of the display 154.

For example, in the case in which the status of the network multifunction peripheral 1 is not equivalent to the preset specific status, the display image data displayed on the display 154 in FIG. 6A is transmitted from the network multifunction peripheral 1 to the information terminal 3 through the image transmission processing. As illustrated in FIG. 6B, then, received display image data is preferably displayed on a preset display region 402 in an image 401 on a web browser in the display 25 of the information terminal 3. At this time, the information terminal 3 gives access to a web server provided in the network multifunction peripheral 1 through the web browser so that the display image data is received and displayed as illustrated in FIG. 6B. It is not essential that the network multifunction peripheral 1 includes the web server. For example, it is also possible to employ a structure in which the display image data is stored in a predetermined web server on the internet and the information terminal 3 gives access to the web server to acquire the display image data. Moreover, it is also possible to employ a structure in which the information terminal 3 directly receives the display image data.

Figure 7A:
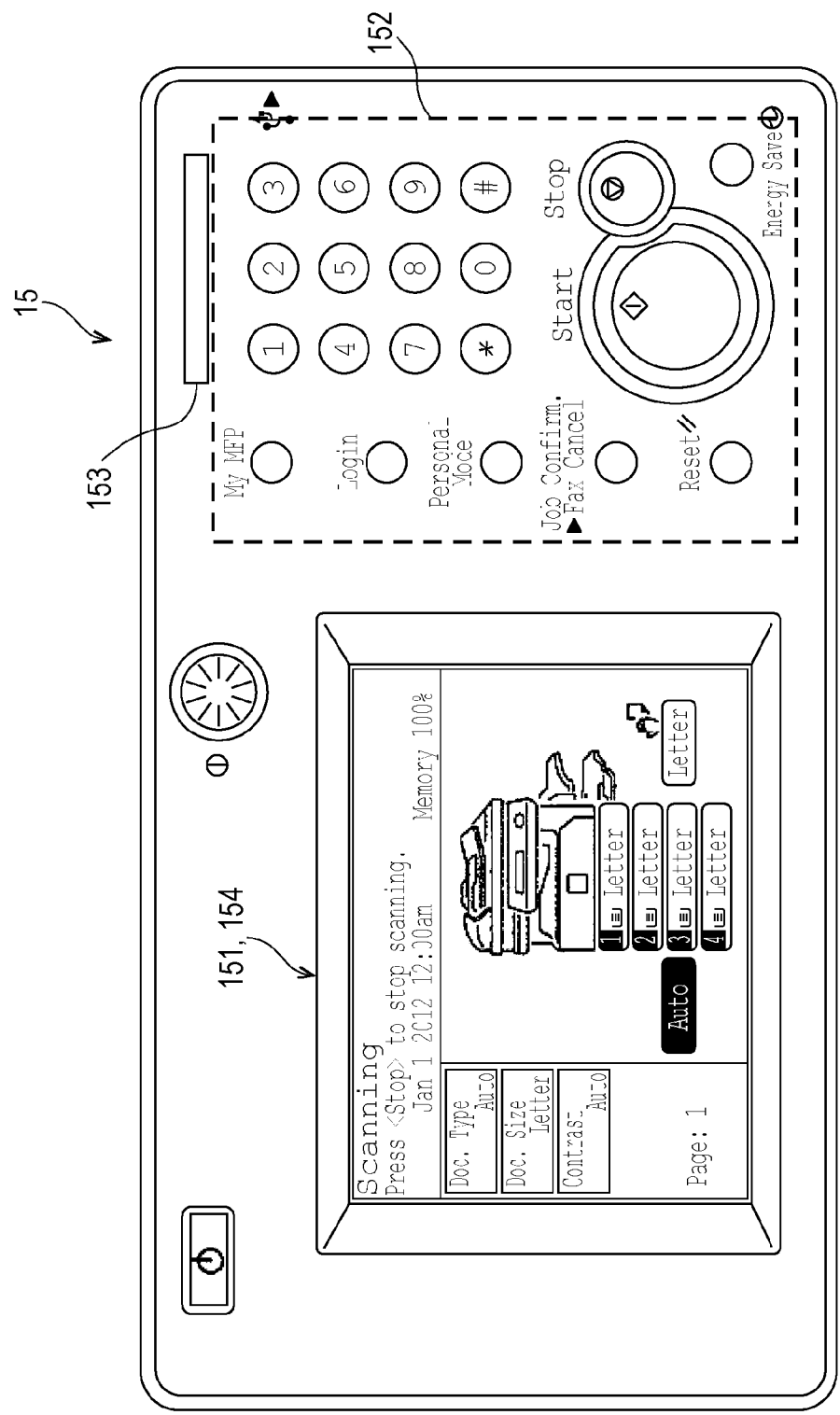
FIG. 7A is a view illustrating the external appearance of the operation panel of the network multifunction peripheral and FIG. 7B is a view illustrating an image to be displayed in a preset display region on a web browser.
Figure 7B:
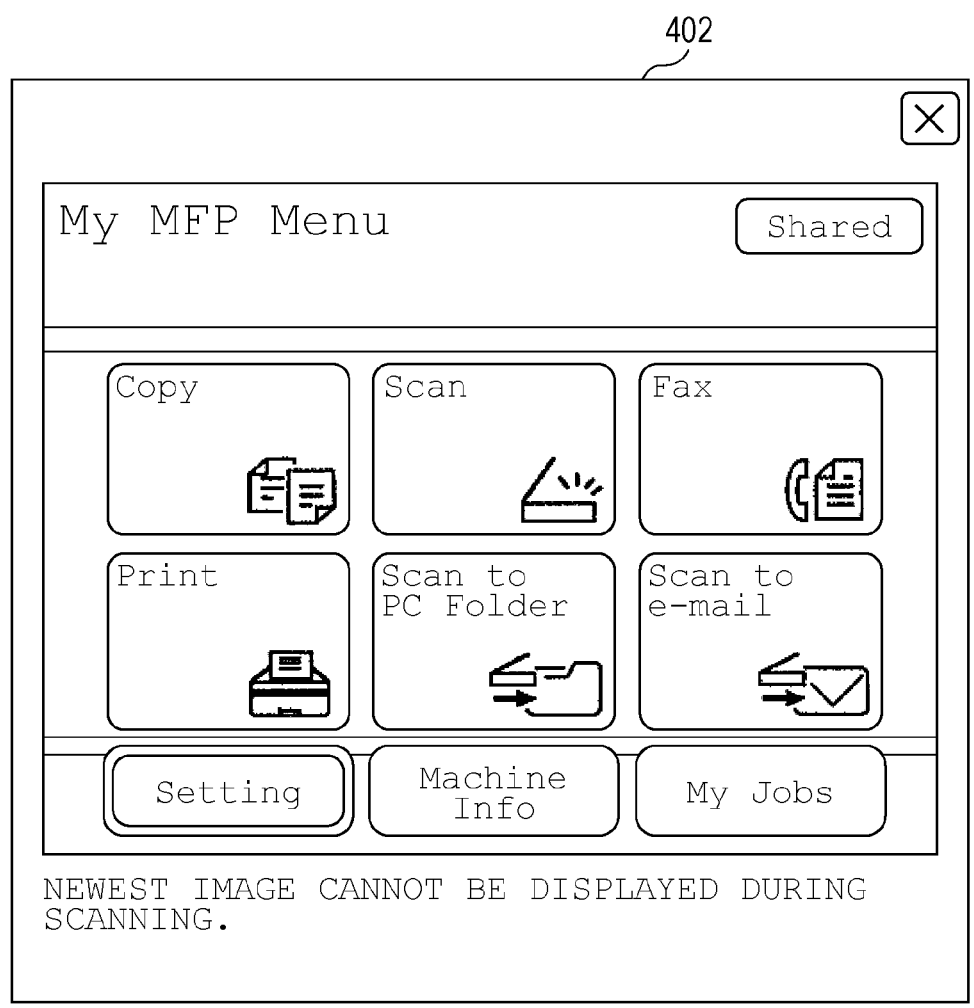

FIGS. 7A and 7B are views explaining the image transmission processing to be executed in the case in which the deciding unit 106 decides that the status of the network multifunction peripheral 1 is equivalent to the scanning status.

FIG. 7A is a view illustrating an external appearance of the operation panel 15 in the network multifunction peripheral 1 and FIG. 7B is a view illustrating an image displayed on the preset display region 402 over the web browser. In a case in which the status of the network multifunction peripheral 1 is equivalent to the scanning status, an image indicating a status in which the scanning is being carried out as illustrated in a region of the display 154 in FIG. 7A is displayed on the display 154 of the operation panel 15. At this time, a different image from the image displayed on the display 154 of the network multifunction peripheral 1 is preferably displayed on the display 25 of the information terminal 3, and furthermore, status information (a message) indicative of the scanning status is displayed thereon. In the case of FIG. 7A, the scanning is being carried out simply. In some cases, however, contents of a document subjected to the scanning are previewed and displayed during the scanning. In the case in which the preview display might be carried out, consequently, the image is not transmitted to the information terminal 3 but the newest image display data which has not been set into the scanning status is displayed together with the message indicative of the scanning status. For this reason, the contents of the scanned document can be prevented from leaking out to the user of the information terminal 3.

FIG. 7 is a view illustrating the case in which the deciding unit 106 decides that the status of the network multifunction peripheral 1 is equivalent to the scanning status. Also in the case in which the status of the network multifunction peripheral 1 is equivalent to the log-in status or the panel operating status which is the preset specific status other than the scanning status, processing is carried out in the same manner as in the scanning status. In other words, in the case of the log-in status or the panel operating status, status information (a message) indicative of the log-in status or the panel operating status is displayed in place of the status information (the message) indicative of the scanning status.

Description will be given to the case in which the receiving unit 201 of the information terminal 3 receives image non-acquirement information transmitted by the transmitting unit 105 in Step S101 of the image transmission processing, which is not illustrated. If the image non-acquirement information is received by the receiving unit 201, the display control unit 203 is preferably arranged and programmed to display a coal-black image on the display region 402 over the web browser of the display unit 202 together with a message indicating that the display image data has not been acquired yet.

According to the network multifunction peripheral 1 in accordance with the present preferred embodiment, the display image data displayed on the display unit 101 can be prevented from being transmitted to the information terminal 3 by the transmitting unit 105 when the network multifunction peripheral 1 is maintained in the preset specific status.

Therefore, the contents on the screen indicated by the display image data can be prevented from leaking out to the user of the information terminal 3.

According to the network multifunction peripheral 1 in accordance with the present preferred embodiment, moreover, the deciding unit 106 decides that the status in which the operating unit 108 is operated by the user indicates that the network multifunction peripheral 1 is maintained in the preset specific status. Therefore, the display image data displayed on the display unit 101 can be prevented from being transmitted to the information terminal 3 by the transmitting unit 105 in the case in which the operation of the operating unit 108 is carried out by the user.

According to the network multifunction peripheral 1 in accordance with the present preferred embodiment, furthermore, the display image data displayed on the display unit 101 can be inhibited from being transmitted to the information terminal 3 by the transmitting unit 105 when the following operation is accepted by the operating unit 108. The operation includes an operation of registering or changing a destination for a destination table and an operation of registering or changing a password for logging in to the network multifunction peripheral 1 by a user. For this reason, the contents registered in the destination table or the password can be prevented from leaking out to the user of the information terminal 3.

According to the network multifunction peripheral 1 in accordance with the present preferred embodiment, moreover, the inhibiting unit 107 inhibits the display image data displayed on the display unit 101 from being transmitted to the information terminal 3 by the transmitting unit 105 when the operating unit 108 accepts the input of the password. When the password is to be input, for example, the password itself is not displayed on the display unit but a mark (for example, "*") of the number corresponding to the number of digits of the password is displayed. If the display image data at this time is acquired, the user of the information terminal 3 can know the number of the digits of the password by counting the number of "*". When the password is to be input, moreover, it is also possible to suppose the case in which the password itself is displayed on the display unit 101. If the display image data at this time is acquired, the user of the information terminal 3 can know the password itself. In other words, the network multifunction peripheral 1 according to a preferred embodiment of the present invention can prevent the number of the digits of the password or the password from leaking out to the user of the information terminal 3.

According to the network multifunction peripheral 1 in accordance with the present preferred embodiment, furthermore, the inhibiting unit 107 inhibits the display image data in the preview and display of the reading result on the display unit 101 from being transmitted to the information terminal 3 by the transmitting unit 105. For this reason, the contents of the read document can be prevented from leaking out to the user of the information terminal 3.

According to the network multifunction peripheral 1 in accordance with the present preferred embodiment, moreover, the inhibiting unit 107 inhibits the display image data displayed in the log-in to the network multifunction peripheral 1 by the user from being transmitted to the information terminal 3 by the transmitting unit 105. For example, therefore, the contents on the user dedicated screen displayed on the display unit 101 during the log-in can be prevented from leaking out to the user of the information terminal 3.

According to the network multifunction peripheral 1 in accordance with the present preferred embodiment, furthermore, the inhibiting unit 107 preferably does not update the display image data stored in the storage unit 103 in a case where the deciding unit 106 decides that the network multifunction peripheral 1 is maintained in the preset specific status. For this reason, the display image data displayed on the display unit 101 can be prevented from being transmitted to the information terminal 3 by the transmitting unit 105 when the network multifunction peripheral 1 is maintained in the preset specific status.

According to the network multifunction peripheral 1 in accordance with the present preferred embodiment, moreover, the transmitting unit 105 further transmits, to the information terminal 3, the status information indicating that the network multifunction peripheral 1 is maintained in the preset specific status in the case where the deciding unit 106 decides that the network multifunction peripheral 1 is maintained in the preset specific status. For this reason, the user of the information terminal 3 can know that the status of the network multifunction peripheral 1 is equivalent to a status in which the update to the display image data displayed on the display unit at that time cannot be carried out.

For example, moreover, the transmitting unit 105 may transmit, to the information terminal 3, the display image data stored in the storage unit 103 together with the status information when transmitting the status information to the information terminal 3.

For this reason, the user of the information terminal 3 can know that the network multifunction peripheral 1 is maintained in a status in which the display image data displayed on the display unit 101 at that time cannot be updated, and furthermore, the contents of the newest display image data which has not been brought into the update disabling status.

According to the network multifunction peripheral 1 in accordance with the present preferred embodiment, moreover, the transmitting unit 105 preferably further transmits, to the information terminal 3, image non-acquirement information indicating that the display image data has not been acquired yet in the case in which the acquiring unit 104 has not acquired the display image data displayed on the display unit 101 yet. For this reason, the user of the information terminal 3 can know that the display image data has not been displayed on the display unit 101 yet in the network multifunction peripheral 1.

Figure 8:
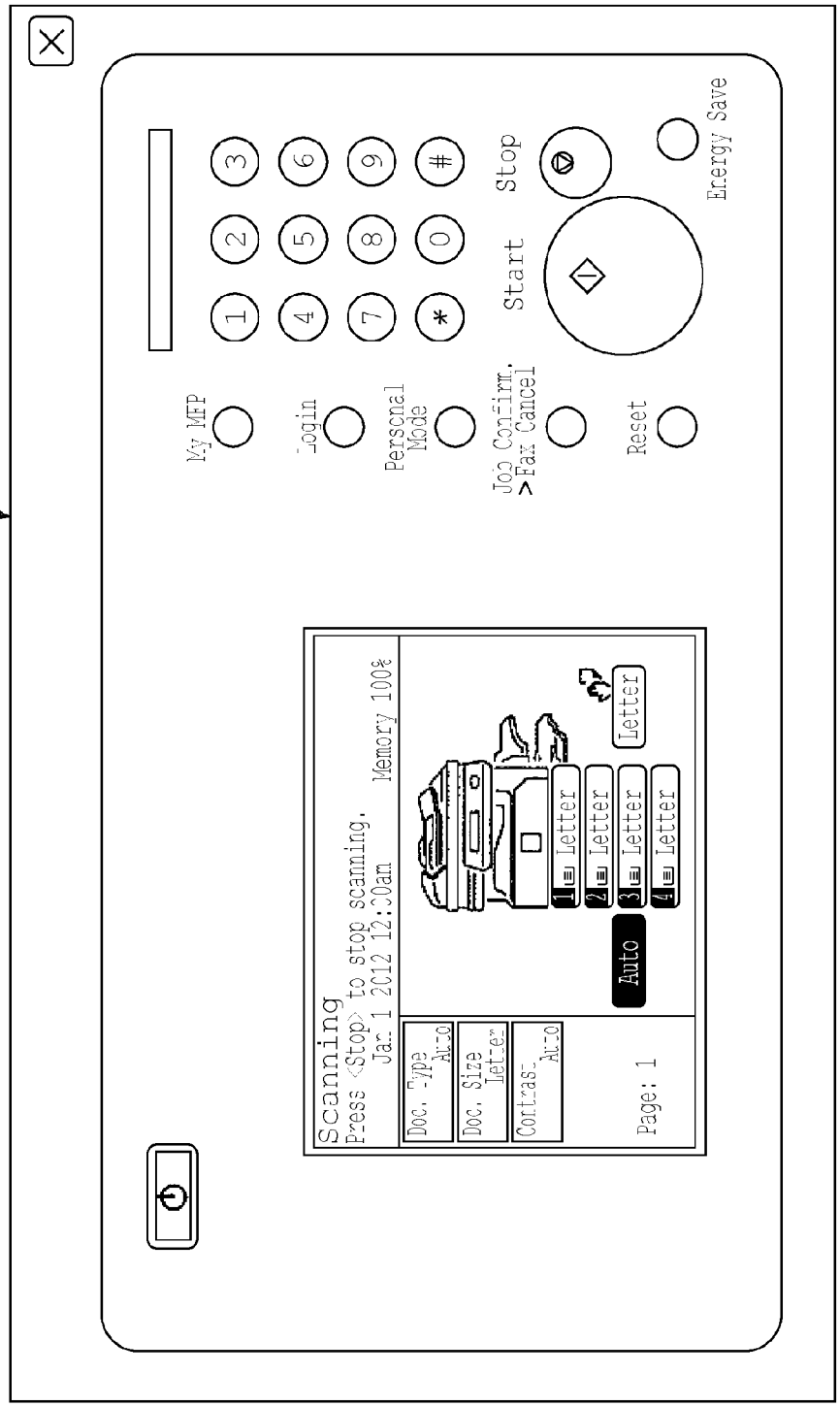
FIG. 8 is a view illustrating an image to be displayed in a preset display region on a web browser according to another preferred embodiment of the present invention.

Although the display image data to be displayed on the display 25 of the information terminal 3 preferably is only the display image data to be displayed on the display 154 of the network multifunction peripheral 1 according to the present preferred embodiment in the network multifunction peripheral 1, the present invention is not restricted thereto. For example, as illustrated in FIG. 8, the display image data may be displayed together with the external appearance and status of the operation panel 15 in the network multifunction peripheral 1. FIG. 8 is a view illustrating an image to preferably be displayed on the preset display region 402 over the web browser according to another preferred embodiment of the present invention. FIG. 9 is a block diagram illustrating a functional structure related to image transmission processing of the network multifunction peripheral 1 according to another preferred embodiment of the present invention.

In another preferred embodiment illustrated in FIG. 9, an information processing system 310 preferably includes a structure in which an information processing device 210 includes a model information acquiring unit 204 in a different manner than the information processing device 200 of the information processing system 300 according to the preferred embodiment described above. Moreover, an acquiring unit 104 and a transmitting unit 105 preferably have different functions. Thus, the information processing system 310 has only a portion of structures and functions which are different from those of the information processing system 300 according to the previously discussed preferred embodiment and the other structures and functions which are the same as those of the information processing system 300. Therefore, description will be given to only the different structures and functions.

In the information processing system 310, the acquiring unit 104 further acquires terminal status information indicative of a communication terminal status of a communication terminal device 100 which is displayed on a display lamp 153 in the communication terminal device 100. Moreover, the transmitting unit 105 further transmits the terminal status information acquired by the acquiring unit 104 to the information processing device 210.

In other words, in the communication terminal device 100, the acquiring unit 104 is arranged and programmed to acquire the terminal status information indicative of the communication terminal status of the communication terminal device 100 which is displayed on the display lamp 153 together with display image data displayed on a display unit 101. Then, the transmitting unit 105 transmits, to the information processing device 210, the display image data and the terminal status information which are acquired by the acquiring unit 104. At this time, the display image data and the terminal status information which are acquired by the acquiring unit 104 are temporarily stored in a storage unit 103.

The information processing device 210 preferably further includes the model information acquiring unit 204 as described above. The model information acquiring unit 204 preferably is a control unit implemented by the CPU 21, the program 122 or the like in FIG. 3. The model information acquiring unit 204 is arranged and programmed to acquire, from the communication terminal device 100, model information to be information about a model of the communication terminal device 100 to be connected to the information processing device 210. Specifically, the model information acquiring unit 204 specifies the model information based on an MAC address of the communication terminal device 100 or an identifier for specifying the communication terminal device 100, so as to acquire the model information. Moreover, a receiving unit 201 receives the terminal status information transmitted together with the display image data. Then, a display control unit 203 generates an operation panel image indicative of an external appearance of an operation panel 15 of the communication terminal device 100 corresponding to the model information acquired by the model information acquiring unit 204 based on the model information. Thereafter, the display control unit 203 further reproduces a lighting status of the display lamp 153 displayed on the operation panel 15 into the operation panel image and displays the operation panel image on a display region 403 of a display unit 202 by using the display image data and the terminal status information which are received by the receiving unit 201.

Thus, the communication terminal device 100 preferably acquires the terminal status information together with the display image data and transmits, to the information processing device 210, the display image data and the terminal status information which are acquired in such a manner that the lighting status of the display lamp 153 can be reproduced in addition to the display image data. For this reason, a service technician to be a user of the information processing device 210 can easily determine a status of a network multifunction peripheral 1 and can take a proper countermeasure.

Although the communication terminal device 100 according to the present preferred embodiment preferably includes the structure in which the storage unit 103 can store only display image data indicative of a single image, the present invention is not restricted thereto but it is also possible to employ a structure in which display image data indicative of a plurality of images can be stored. In the case of the structure, when the deciding unit 106 decides that the communication terminal device 100 is maintained in a preset specific status in image transmission processing, the transmitting unit 105 transmits, to an information terminal 3, the newest display image data in the display image data which has already been stored in the storage unit 103 before the decision.

Although the information processing system 300 according to a preferred embodiment of the present invention preferably executes processing of superposing a message indicated by status information on an image indicated by the display image data which has already been stored in the storage unit 103 when the status information is generated by the acquiring unit 104, the present invention is not restricted thereto. In other words, there is employed a structure in which the transmitting unit 105 transmits, to the information terminal 3, the display image data including the status information superposed thereon and the display control unit 203 is arranged and programmed to display the received display image data on the display unit 202, the present invention is not restricted thereto. For example, the transmitting unit 105 may transmit the status information and the display image data as separate data in place of data obtained by synthesizing them as single display image data. In this case, in the information terminal 3, the message indicated by the status information may be superposed on the display image data received by the display control unit 203 and may be thus displayed on the display unit 202. In other words, the superposition of the message indicated by the status information may be carried out on the information terminal 3 side.

In the network multifunction peripheral 1 according to a preferred embodiment of the present invention, in the case in which the acquiring unit 104 cannot acquire the display image data which is displayed on the display unit 101, the transmitting unit 105 may transmit, to the information terminal 3, acquirement disabling information indicating that the display image data cannot be acquired. The case in which the acquiring unit 104 cannot acquire the display image data can be supposed as the case in which encode processing is carried out over the display image data from a bit map format to a JPEG format, a failure of the encode processing or the like, for example.

At this time, the transmitting unit 105 transmits, to the information terminal 3, the display image data stored in the storage unit 103 together with the acquirement disabling information. The transmission of the acquirement disabling information to the information terminal 3 by the transmitting unit 105 is not an essential requirement. Moreover, the transmitting unit 105 may have a structure in which it transmits only the acquirement disabling information and does not transmit the display image data.

Although the inhibiting unit 107 preferably does not cause the acquiring unit 104 to update the display image data stored in the storage unit 103, so as to inhibit the transmission of the display image data to the information processing device 200 indirectly in the network multifunction peripheral 1 according to a preferred embodiment of the present invention, the present invention is not restricted thereto. In other words, the acquiring unit 104 may have such a structure so as to update the display image data stored in the storage unit 103 into the display image data displayed on the display unit also in the preset specific status. In this case, the inhibiting unit 107 preferably includes such a structure so as to transmit, to the transmitting unit 105, instruction information of non-transmission of the display image data stored in the storage unit 103 to the information processing device 200, so as to inhibit the transmission of the display image data by the transmitting unit 105 directly. In this case, moreover, it is possible to produce equivalent effects to those in the network multifunction peripheral 1 according to a preferred embodiment of the present invention by employing a structure in which the storage unit 103 is arranged to store at least two pieces of display image data, and a structure in which the transmitting unit 105 is arranged to transmit, to the information processing device 200, display image data which is not maintained in the preset specific status, that is, display image data stored directly prior to the newest display image data or at least two pieces of display image data before from the newest display image data when the display image data in the preset specific status is stored in the storage unit 103.

In the network multifunction peripheral 1 according to a preferred embodiment of the present invention, the display image data to be acquired by the acquiring unit 104 may be image data in a bit map format or image data in a JPEG format obtained by carrying out compression processing over image data, for example, which is not particularly described.

Although the present invention has been described based on preferred embodiments and modifications thereof, the present invention is not restricted to the preferred embodiments described above. The following additional examples of preferred embodiments are also included in the present invention.

Each of the devices can be specifically implemented by a computer system defined by a microprocessor, a ROM, a RAM, a hard disk unit, a display unit, a keyboard, a mouse and the like. A computer program is stored on a non-transitory computer readable medium. The microprocessor is operated in accordance with the computer program so that each of the devices achieves a function thereof. The computer program is preferably provided by combining a plurality of command codes indicative of an instruction to a computer in order to achieve a predetermined function.

A portion or all of the components defining each of the devices may be provided by a single system LSI (Large Scale Integration). The system LSI is preferably a supermultifunctional LSI manufactured by integrating a plurality of components on a single chip, and specifically, is a computer system arranged to include the microprocessor, the ROM, the RAM and the like. The computer program is stored in the ROM. The microprocessor loads the computer program from the ROM to the RAM and carries out an operation such as a calculation in accordance with the loaded computer program so that the system LSI achieves the function.

A portion or all of the components defining each of the devices may be provided by an IC card which can be removed from and attached to each of the devices or a module to be a simple body. The IC card or the module is a computer system defined by a microprocessor, an ROM, an RAM and the like. The supermultifunctional LSI may be included in the IC card or the module. The microprocessor is operated in accordance with the computer program so that the IC card or the module achieves a function thereof. The IC card or the module may have a tamper resistance.

Preferred embodiments of the present invention may be implemented by the methods described above. Moreover, these methods may be realized by a computer program stored on a non-transitory computer readable medium to be implemented by a computer.

Moreover, preferred embodiments of the present invention may be implemented by recording a computer program or a digital signal in a non-tangible computer readable recording medium, for example, a flexible disk, a hard disk, a CD-ROM, an MO, a DVD, a DVD-ROM, a DVD-RAM, a BD (Blu-ray Disc), a semiconductor memory or the like. Furthermore, preferred embodiments of the present invention may be implemented by the digital signal recorded in these non-tangible computer readable recording media.

Furthermore, preferred embodiments of the present invention provide the computer system including the microprocessor and the memory. The memory stores a computer program and the microprocessor may be operated in accordance with the computer program.

In addition, it is also possible to carry out execution through another independent computer system by recording a program in a recording unit or transferring the program or the digital signal or transferring the program via a network or the like.

The preferred embodiments of the present invention and variations or modifications thereof may be combined respectively.

Although the communication terminal device or the like according to preferred embodiments of the present invention have been described above based on the preferred embodiments, the present invention is not restricted to the preferred embodiments. The preferred embodiments of the present invention may be variously changed by the skilled in the art or a configuration constructed by combining components according to the different preferred embodiment may be included within a range of one or more aspects according to the present invention without departing from the gist of the present invention.

Preferred embodiments of the present invention are useful as a network multifunction peripheral or the like which can prevent display image data displayed on a display unit from being transmitted to an information processing device by a transmitting unit and can inhibit contents on a screen indicated by the display image data from leaking out to a user of the information processing device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal device connected to an information processing device in a communicable status, the communication terminal device comprising:
   a display unit;
   a storage unit;
   an acquiring unit arranged and programmed to acquire display image data displayed on the display unit and to store the acquired display image data in the storage unit;
   a transmitting unit arranged and programmed to transmit the display image data stored in the storage unit to the information processing device in response to a request from the information processing device;
   a deciding unit arranged and programmed to decide whether the communication terminal device is maintained in a preset specific status or not; and
   an inhibiting unit arranged and programmed to inhibit the display image data displayed on the display unit from being transmitted to the information processing device by the transmitting unit in a case where the deciding unit decides that the communication terminal device is maintained in the preset specific status; wherein the acquiring unit is arranged and programmed to acquire the display image data displayed on the display unit at a predetermined time interval and to update the display image data stored in the storage unit into the display image data acquired at the predetermined time interval at any time; and the inhibiting unit is arranged and programmed to prevent the display image data stored in the storage unit from being updated by the acquiring unit, so as to inhibit the display image data displayed on the display unit from being transmitted to the information processing device by the transmitting unit, in a case where the deciding unit decides that the communication terminal device is maintained in the preset specific status.

2. The communication terminal device according to claim 1, further comprising an operating unit arranged and programmed to accept an operation from a user, wherein
the deciding unit decides that the communication terminal device is maintained in the preset specific status in a case where the operating unit is operated by a user.

3. The communication terminal device according to claim 2, wherein the deciding unit decides that the communication terminal device is maintained in the preset specific status in a case where the operating unit accepts at least one of an operation to register or change a destination of a destination table and an operation to register or change a password used in logging in to the communication terminal device by the user.

4. The communication terminal device according to claim 2, wherein the deciding unit is arranged and programmed to decide that the communication terminal device is maintained in the preset specific status in a case where the operating unit accepts an input of a password.

5. The communication terminal device according to claim 1, further comprising:
a reading unit arranged and programmed to read a document; wherein
the deciding unit is arranged and programmed to decide that the communication terminal device is maintained in the preset specific status in a case where a result of the reading is previewed and displayed on the display unit.

6. The communication terminal device according to claim 1, wherein the deciding unit is arranged and programmed to decide that the communication terminal device is maintained in the preset specific status in a case where a user logs in to the communication terminal device.

7. The communication terminal device according to claim 1, wherein the transmitting unit is arranged and programmed to further transmit, to the information processing device, status information indicating that the communication terminal device is maintained in the preset specific status in a case where the deciding unit decides that the communication terminal device is maintained in the preset specific status.

8. The communication terminal device according to claim 7, wherein the transmitting unit is arranged and programmed to transmit, to the information processing device, the display image data stored in the storage unit together with the status information when transmitting the status information to the information processing device.

9. A communication terminal device connected to an information processing device in a communicable status, the communication terminal device comprising:
a display unit;
a storage unit;
an acquiring unit arranged and programmed to acquire display image data displayed on the display unit and to store the acquired display image data in the storage unit;
a transmitting unit arranged and programmed to transmit the display image data stored in the storage unit to the information processing device in response to a request from the information processing device;
a deciding unit arranged and programmed to decide whether the communication terminal device is maintained in a preset specific status or not; and
an inhibiting unit arranged and programmed to inhibit the display image data displayed on the display unit from being transmitted to the information processing device by the transmitting unit in a case where the deciding unit decides that the communication terminal device is maintained in the preset specific status; wherein
the acquiring unit is arranged and programmed to update the display image data stored in the storage unit into the display image data displayed on the display unit every time the display image data displayed on the display unit are updated; and
the inhibiting unit is arranged and programmed to prevent the display image data stored in the storage unit from being updated by the acquiring unit, so as to inhibit the display image data displayed on the display unit from being transmitted to the information processing device by the transmitting unit, in a case where the deciding unit decides that the communication terminal device is maintained in the preset specific status.

10. A communication terminal device connected to an information processing device in a communicable status, the communication terminal device comprising:
a display unit;
a storage unit;
an acquiring unit arranged and programmed to acquire display image data displayed on the display unit and to store the acquired display image data in the storage unit;
a transmitting unit arranged and programmed to transmit the display image data stored in the storage unit to the information processing device in response to a request from the information processing device;
a deciding unit arranged and programmed to decide whether the communication terminal device is maintained in a preset specific status or not; and
an inhibiting unit arranged and programmed to inhibit the display image data displayed on the display unit from being transmitted to the information processing device by the transmitting unit in a case where the deciding unit decides that the communication terminal device is maintained in the preset specific status; wherein
the transmitting unit is arranged and programmed to further transmit, to the information processing device, acquirement disabling information indicating that the display image data is not acquired in a case where the acquiring unit acquires no display image data displayed on the display unit.

11. The communication terminal device according to claim 10, wherein the transmitting unit is arranged and programmed to transmit, to the information processing device, the display image data stored in the storage unit together with the acquirement disabling information when transmitting the acquirement disabling information to the information processing device.

12. The communication terminal device according to claim 1, further comprising an operation panel including an operation button and a display lamp; wherein
the acquiring unit is arranged and programmed to further acquire terminal status information indicative of a communication terminal status of the communication terminal device which is displayed on the display lamp; and the transmitting unit is arranged and programmed to further transmit the terminal status information acquired by the acquiring unit to the information processing device.

13. A communication terminal device connected to an information processing device in a communicable status, the communication terminal device comprising:

a display unit;

a storage unit;

an acquiring unit arranged and programmed to acquire display image data displayed on the display unit and to store the acquired display image data in the storage unit;

a transmitting unit arranged and programmed to transmit the display image data stored in the storage unit to the information processing device in response to a request from the information processing device;

a deciding unit arranged and programmed to decide whether the communication terminal device is maintained in a preset specific status or not; and an inhibiting unit arranged and programmed to inhibit the display image data displayed on the display unit from being transmitted to the information processing device by the transmitting unit in a case where the deciding unit decides that the communication terminal device is maintained in the preset specific status; wherein the transmitting unit is arranged and programmed to further transmit, to the information processing device, image non-acquirement information indicating that the display image data has not been acquired yet in a case where the acquiring unit has not acquired the display image data displayed on the display unit yet.

14. An information processing system comprising:

a communication terminal device; and an information processing device connected to the communication terminal device in a communicable status;

the communication terminal device including:

a first display unit;

a storage unit;

an acquiring unit arranged and programmed to acquire display image data displayed on the first display unit and store the acquired display image data in the storage unit;

a transmitting unit arranged and programmed to transmit the display image data stored in the storage unit to the information processing device in response to a request from the information processing device;

a deciding unit arranged and programmed to decide whether the communication terminal device is maintained in a preset specific status or not; and an inhibiting unit arranged and programmed to inhibit the display image data displayed on the display unit from being transmitted to the information processing device by the transmitting unit in a case where the deciding unit decides that the communication terminal device is maintained in the preset specific status; and the information processing device including:

a second display unit;

a receiving unit arranged and programmed to receive the display image data transmitted by the transmitting unit; and a display control unit arranged and programmed to display, on the second display unit, the display image data received by the receiving unit; wherein the communication terminal device further includes an operation panel including at least a display lamp;

the acquiring unit is arranged and programmed to further acquire terminal status information indicative of a communication terminal status of the communication terminal device which is displayed on the display lamp;

the transmitting unit is arranged and programmed to further transmit the terminal status information acquired by the acquiring unit to the information processing device;

the information processing device further includes a model information acquiring unit arranged and programmed to acquire, from the communication terminal device, model information to be information about a model of the communication terminal device connected to the information processing device;

the receiving unit is arranged and programmed to further eceive the terminal status information transmitted by the transmitting unit; and the display control unit is arranged and programmed to generate an operation panel image indicative of an external appearance of the operation panel of the communication terminal device corresponding to the model information based on the model information acquired by the model information acquiring unit, and to reproduce a status of the display lamp displayed on the operation panel into the operation panel image and display the operation panel image on the second display unit by using the terminal status information received by the receiving unit.

* * * * *